United States Patent
Barry et al.

(10) Patent No.: US 7,024,540 B2
(45) Date of Patent: Apr. 4, 2006

(54) METHODS AND APPARATUS FOR ESTABLISHING PORT PRIORITY FUNCTIONS IN A VLIW PROCESSOR

(75) Inventors: Edwin Frank Barry, Vilas, NC (US); Edward A. Wolff, Chapel Hill, NC (US); Patrick Rene Marchand, Apex, NC (US); David Carl Strube, Raleigh, NC (US)

(73) Assignee: PTS Corporation, San Jose, CA (US)

( * ) Notice: Subject to any disclaimer, the term of this patent is extended or adjusted under 35 U.S.C. 154(b) by 336 days.

(21) Appl. No.: 10/695,071

(22) Filed: Oct. 28, 2003

(65) Prior Publication Data

US 2004/0093484 A1 May 13, 2004

Related U.S. Application Data

(63) Continuation of application No. 09/598,084, filed on Jun. 21, 2000, now Pat. No. 6,654,870.

(60) Provisional application No. 60/140,325, filed on Jun. 21, 1999.

(51) Int. Cl.
*G06F 12/00* (2006.01)
(52) U.S. Cl. .................................... 712/200
(58) Field of Classification Search ................ 712/200; 711/147, 151, 152, 153, 158
See application file for complete search history.

(56) References Cited

U.S. PATENT DOCUMENTS

| | | | | |
|---|---|---|---|---|
| 5,055,712 A | * | 10/1991 | Hawley et al. ................ 326/40 |
| 5,450,556 A | * | 9/1995 | Slavenburg et al. ......... 712/235 |
| 5,644,780 A | * | 7/1997 | Luick ............................ 712/23 |
| 5,742,782 A | * | 4/1998 | Ito et al. ...................... 712/210 |
| 6,055,628 A | * | 4/2000 | Seshan et al. ............... 712/235 |
| 6,076,154 A | * | 6/2000 | Van Eijndhoven et al. ... 712/24 |
| 6,112,299 A | * | 8/2000 | Ebcioglu et al. ............ 712/236 |
| 6,363,475 B1 | * | 3/2002 | Dowling ...................... 712/206 |
| 6,370,623 B1 | * | 4/2002 | Mehra et al. ................ 711/149 |
| 6,510,510 B1 | * | 1/2003 | Garde ......................... 712/218 |

* cited by examiner

*Primary Examiner*—Eric Coleman (74) *Attorney, Agent, or Firm*—Priest & Goldstein, PLLC (57) ABSTRACT

Port priorities are defined on a 32-bit word, 16-bit half-word, and 8-bit byte basis to control the write enable signals to a compute register file (CRF). With a manifold array (ManArray) reconfigurable register file, it is possible to have double-word 64-bit and single word 32-bit data-type instructions mixed with other double-word, single-word, half-word, or byte data-type instructions within the same very long instruction word (VLIW). By resolving a write priority conflict on the byte, half-word, or word that is in conflict during the VLIW execution, it is possible to have partial operations complete that provide a useful function. For example, a load half-word to the half-word H0 portion of a 32-bit register R0 can have priority to complete its operation while a 64-bit shift of the register pair R0 and R1 will complete its operation on the non-conflicting half-word portions of the 64-bit register R0 and R1. Other unique capabilities result from the present approach to assigning port priorities that improve the performance of the ManArray indirect VLIW processor.

12 Claims, 12 Drawing Sheets

FIG. 4C — LVa ENCODING (454)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | Ctrlop | | | E/D | UAF | | InstrCnt | | | | PORT PRIORITY | | | SU | LU | ALU | MAU | DSU | Vb | 0 | VIMOFFS | | | | | | | | |

{ 455 }

FIG. 4D — LVb1 ENCODING (456)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | Ctrlop | | | E/D | UAF | | InstrCnt | | | | PORT PRIORITY | | | SU | LU | ALU | MAU | DSU | Vb | 0 | VIMOFFS | | | | | | | | |

LVb2 ENCODING (457)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| PORT PRIORITY | | | | | | | | | | | | | | | | | | | | | | | | | | | | | | | |

{ 460 }

FIG. 4E — XVa ENCODING (464)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | Ctrlop | | | VX | UAF | | RFI | CE2 | | | PORT PRIORITY | | | SU | LU | ALU | MAU | DSU | Vb | 0 | VimOffs | | | | | | | | |

Lv PARAMETER ENCODING — 470

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | | Ctrlop | | | OPCODE EXTENSION | | | PORT PRIORITY | | | | | | | | | | | | | | | | | | | | | |

| | STORE | LOAD | ALU | MAU | DSU |
|---|---|---|---|---|---|
| 1 (501) | sd.s.w r1,temp | | CmpGT.s.w r3,r4 | sub.sm.w r5,r3,r4 | shr.sd.sw r2,r2,r7 |
| 2 (502) | | T.lii.s.w r0, a0+, 1 | T.sub.sa.w r4,r6,r5 | F.addi.sm.w r5,r3,0 | T.shl.sd.ld r0,r0,r4 |
| 3 (503) | | ld.s.w r2, temp | F.sub.sa.w r4,r4,r3 | sub.sm.w r7,r6,r3 | shl.sd.ld r0,r0,r5 |

```
702 {
    start_0_0:
    lim.s.w. A0, COEFF
    lim.s.w. A1, DATA
    lim.s.w. A2, OUTPUT lii.s.d R10, A0+,0        ! Load 4 taps in R10/R11
    xor.pa.1d R0, r0, r0      ! set R0/R1 = 0

704 {
    lv.p.v0, 0, 5, d=, f=     ! Load VIM Location 0 with 5 instructions
    ┌─────────────────────────────────────────────────────────────────────┐
    │ lii.s.h0 R0,A1+,1        ! Load halfword from memory Data into R0.H0│
    │ shli.sd.1d R0,r0,16      ! Shift Left R0/R1 1-halfword              │
    └─────────────────────────────────────────────────────────────────────┘
    sum2p.sm.4sh R2, r0, r10  ! Mpy 4 halfword (data) x 4 taps (results summed in R2&R3)
    add.sa.lw R4, r2, r3      ! Add to halfsums R2/R3 togther to R4
    sii.s.w R4, A2+, 1        ! Store R4 word to output area 706 {
    lim.s.w R16, 1f           ! set up outer loop
    eploopi0 12, 1f           ! Loop (D-T)times = 16-4 = 32
    sspr.s.w r16, IEPOR1      ! reset the loop start address !start pipeline
708 {
    xv.s v0,0,e=ld,f=
    xv.s v0,0,e=ldm,f=
    xv.s v0,0,e=ldm,f=
    xv.s v0,0,e=ldma,f=

710 {
    1:                        ! loop
    xv.s v0,0,e=lmdas,f=

!shut down pipeline
712 {
    xv.s v0,0,e=mdas,f=
    xv.s v0,0,e=mdas,f=
    xv.s v0,0,e=mdas,f=
    xv.p v0,0,e=mas,f=
    xv.p v0,0,e=as,f=
    xv.p v0,0,e=as,f=
    xv.p v0,0,e=s,f=
```

METHODS AND APPARATUS FOR ESTABLISHING PORT PRIORITY FUNCTIONS IN A VLIW PROCESSOR

RELATED APPLICATIONS

The present invention is a continuation of U.S. Ser. No. 09/598,084 filed Jun. 21, 2000 now U.S. Pat. No. 6,654,870, which claims the benefit of U.S. Provisional Application Ser. No. 60/140,325 filed Jun. 21, 1999, both of which are incorporated by reference herein in their entirety.

FIELD OF THE INVENTION

The present invention relates generally to improvements in very long instruction word (VLIW) processing, and more particularly to methods and apparatus for providing port priority functions in a VLIW processor.

BACKGROUND OF THE INVENTION

In VLIW processors, multiple short instruction words (SIWs) are typically executed in parallel to provide high performance. It is possible to have multiple instructions within a VLIW simultaneously target the same register within a register file. This simultaneous targeting produces a conflict situation. One of the ways hardware typically deals with the situation is by treating the conflicting instructions as a no-operation (nop) and indicating an error has occurred, or by indicating an error situation exists and assigning priorities to the instructions to control which single instruction wins in writing to the conflicting target register. When the conflict "hazard" occurs, it usually means an error situation has occurred and typically no advantage can be found in the situation.

SUMMARY OF THE INVENTION

In the present invention, write port priorities are defined on a 32-bit word, 16-bit half-word, and 8-bit byte basis to control the write enable signals to a compute register file (CRF). With a ManArray reconfigurable register file, as further described in U.S. patent application Ser. No. 09/169,255 entitled "Methods and Apparatus for Dynamic Instruction Controlled Reconfigurable Register File with Extended Precision" filed Oct. 9, 1998, it is possible to have instructions that operate on double-word data (64-bits) mixed with instructions that operate on single-word data (32-bits) within the same VLIW. By resolving a write priority conflict on a word basis, it is possible to have half of a double-word operation complete, on the single word portion of the CRF that was not in conflict, while the other conflicting word operation follows the dictates of a hardware priority mechanism. It is also possible to have instructions that operate on double-word data (64-bits) or word data (32-bits) mixed in a VLIW with instructions that operate on half-word data (16-bits), such as a half-word load instruction. In the 64-bit and 16-bit mixed operation case, by resolving a write priority conflict on a half-word basis, it is possible to have the three half-word portions (48-bits) of a double-word operation (64-bits) complete, on the three half-word portions of the CRF register that are not in conflict, while the other conflicting single half-word operation (16-bits) follow the dictates of a hardware priority mechanism. In a similar manner, byte write priorities only come into affect on the byte portions of targeted registers that are in conflict. If no conflict exists, the operation completes normally. This capability allows unique functions that have not typically been available, on prior art processors, as described further below.

These and other features, aspects and advantages of the invention will be apparent to those skilled in the art from the following detailed description taken together with accompanying drawings.

DETAILED DESCRIPTION

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, now U.S. Pat. No. 6,167,502, U.S. patent application Ser. No. 09/169,255 filed Oct. 9, 1998, now U.S. Pat. No. 6,343,356, U.S. patent application Ser. No. 09/169,256 filed Oct. 9, 1998, now U.S. Pat. No. 6,167,501, U.S. patent application Ser. No. 09/169,072, filed Oct. 9, 1998, now U.S. Pat. No. 6,219,776, U.S. patent application Ser. No. 09/187,539 filed Nov. 6, 1998, now U.S. Pat. No. 6,151,668, U.S. patent application Ser. No. 09/205,588 filed Dec. 4, 1998, now U.S. Pat. No. 6,173,389, U.S. patent application Ser. No. 09/215,081 filed Dec. 18, 1998, now U.S. Pat. No. 6,101,592, U.S. patent application Ser. No. 09/228,374 filed Jan. 12, 1999 now U.S. Pat. No. 6,216,223, U.S. patent application Ser. No. 09/238,446 filed Jan. 28, 1999, now U.S. Pat. No. 6,366,999, U.S. patent application Ser. No. 09/267,570 filed Mar. 12, 1999, now U.S. Pat. No. 6,446,190, U.S. patent application Ser. No. 09/337,839 filed Jun. 22, 1999, U.S. patent application Ser. No. 09/350,191 filed Jul. 9, 1999, now U.S. Pat. No. 6,356,994, U.S. patent application Ser. No. 09/422,015 filed Oct. 21, 1999 now U.S. Pat. No. 6,408,382.

U.S. patent application Ser. No. 09/432,705 filed Nov. 2, 1999 entitled "Metboda and Apparatus for Improved Motion Estimation for Video Encoding", U.S. patent application Ser. No. 09/471,217 filed Dec. 23, 1999 entitled "Methods and Apparatus for Providing Data Tranafer Control", U.S. patent application Ser. No. 09/472,372 filed Dec. 23, 1999, now U.S. Pat. No. 6,256,683, U.S. patent application Ser. No. 09/596,103 filed Jun. 16, 2000, now U.S. Pat. No. 6,397,324, U.S. patent application Ser. No. 09/598,567 entitled "Methods and Apparatus for Improved Efficiency in Pipeline Simulation and Emulation" flied Jun. 21, 2000, U.S. patent application Ser. No. 09/598,564 filed Jun. 21, 2000, now U.S. Pat. No. 6,622,234, U.S. patent application Ser. No. 09/598,558 entitled "Methods and Apparatus for Providing Manifold Array (ManArray) Program Context Switch with Array Reconfiguration Control" filed Jun. 21, 2000, and U.S. patent application Ser. No. 09/598,084 entitled filed Jun. 21, 2000, now U.S. Pat. No. 6,654,870, and U.S. patent application Ser. No.09/598,566 entitled "Methods and Apparatus for Generalized Event Detection and Action Specification in A Processor" filed Jun. 21, 2000, as well as, Provisional Application Ser. No. 60/113,637 entitled "Methods and Apparatus for Providing Direct Memory Access (DMA) Engine" filed Dec. 23, 1998, Provisional Application Ser. No. 60/113,555 entitled "Methods and Apparatus Providing Transfer Control" filed Dec. 23, 1998, Provisional Application Ser. No. 60/139,946 entitled "Methods and Apparatus for Data Dependent Address Operations and Efficient Variable Length Code Decoding in a VLIW Processor" filed Jun. 18, 1999, Provisional Application Ser. No. 60/140,245 entitled "Methods and Apparatus for Generalized Event Detection and Action Specification in a Processor" filed Jun. 21, 1999, Provisional Application Ser. No. 60/140,163 entitled "Methods and Apparatus for Improved Efficiency in Pipeline Simulation and Emulation" filed Jun. 21, 1999, Provisional Application Ser. No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" filed Jun. 21, 1999, Provisional Application Ser. No. 60/140,325 entitled "Methods and Apparatus for Establishing Port Priority Function in a VLIW Processor" filed Jun. 21, 1999, Provisional Application Ser. No. 60/140,425 entitled "Methods and Apparatus for Parallel Processing Utilizing a Manifold Array (ManArray) Architecture and Instruction Syntax" filed Jun. 22, 1999, Provisional Application Ser. No. 60/165,337 entitled "Efficient Cosine Transform Implementations on the ManArray Architecture" filed Nov. 12, 1999, and Provisional Application Ser. No. 60/171,911 entitled "Methods and Apparatus for DMA Loading of Very Long Instruction Word Memory" filed Dec. 23, 1999, Provisional Application Ser. No. 60/184,668 entitled "Methods and Apparatus for Providing Bit-Reversal and Multicast Functious Utilizing DMA Controller" filed Feb. 24, 2000, Provisional Application Ser. No. 60/184,529 entitled "Methods and Apparatus for Scalable Array Processor Interrupt Detection and Response" filed Feb. 24, 2000, Provisional Application Ser. No. 60/184,560 entitled "Methods and Apparatus for Flexible Strength Coprocessing Interface" filed Feb. 24, 2000, Provisional Application Ser. No. 60/203,629 entitled "Methods and Apparatus for Power Control in a Scalable Array of Processor Elements" filed May 12, 2000, respectively, all of which are assigned to the assignee of the present invention and incorporated by reference herein in their entirety.

Figure 1:
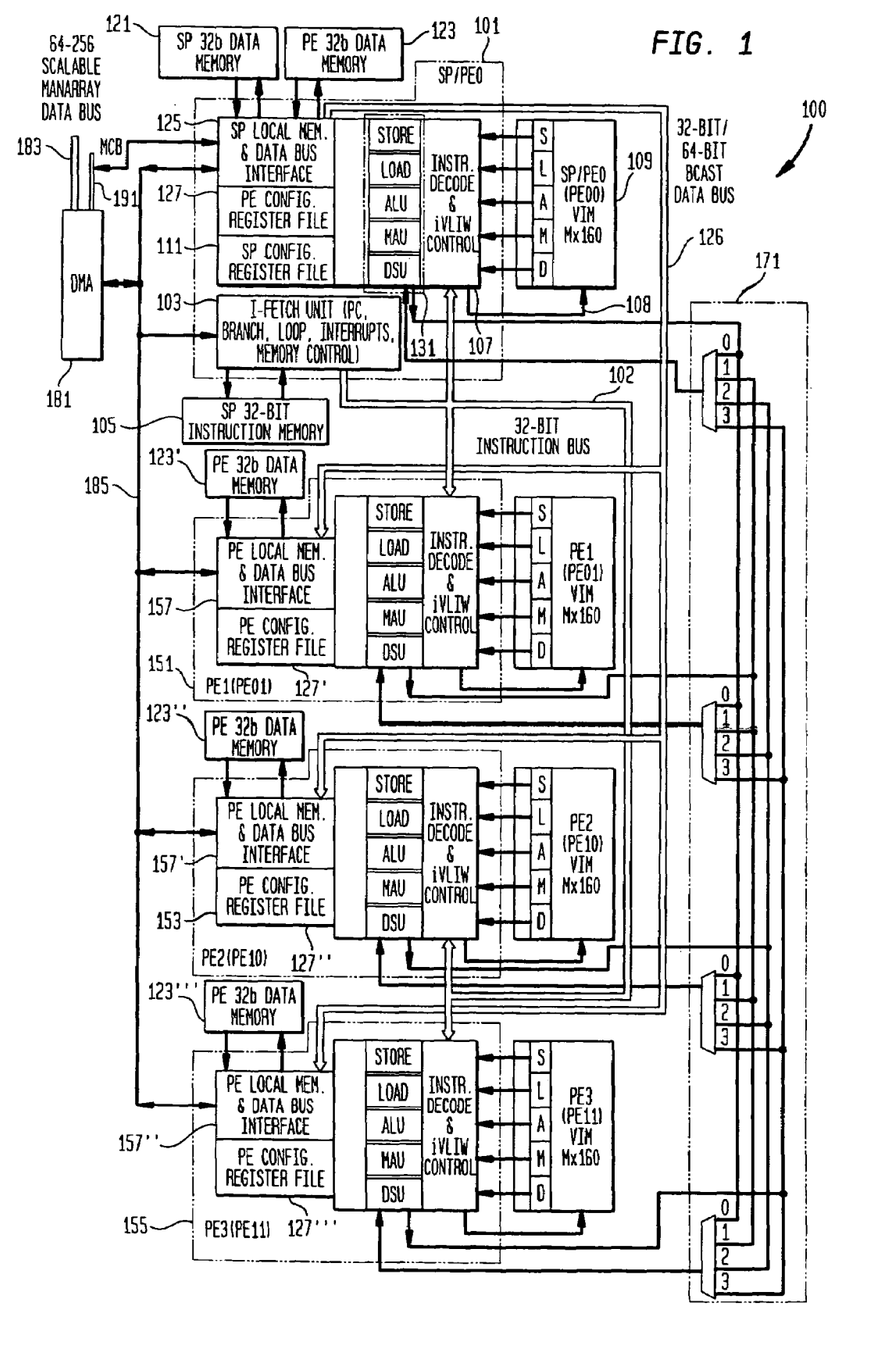
FIG. 1 illustrates an exemplary 2×2 manifold array (ManArray) indirect very long instruction word (iVLIW) processor.

In a presently preferred embodiment of the invention, a ManArray 2×2 iVLIW single instruction multiple data stream (SIMD) processor 100 shown in FIG. 1 contains a controller sequence processor (SP) combined with processing element-0 (PE0) SP/PE0 101, as described in further detail in U.S. application Ser. No. 09/169,072 entitled "Methods and Apparatus for Dynamically Merging an Array Controller with an Array Processing Element". Three additional PEs 151, 153, and 155 are also utilized to demonstrate port priority functions on the ManArray architecture in accordance with the present invention. It is noted that the PEs can also be labeled with their matrix positions as shown in parentheses for PE0 (PE00) 101, PE1 (PE01) 151, PE2 (PE10) 153, and PE3 (PE11) 155.

The combined SP/PE0 101 contains a fetch controller 103 to allow the fetching of short instruction words (SIWs) from a 32-bit instruction memory 105. The fetch controller 103 provides the typical functions needed in a programmable processor such as a program counter (PC), branch capability, digital signal processing, EP loop operations, and support for interrupts. It also provides instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. By way of example, the execution units 131 in the combined SP/PE0 101 can be separated into a set of execution units optimized for a particular control function, for example, fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. These iVLIWs are identified by the letters SLAMD in VIM 109. The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127, 127', 127", and 127''' which is described in further detail in U.S. patent application Ser. No. 09/169,255 entitled "Methods and Apparatus for Dynamic Instruction Controlled Reconfiguration Register File with Extended Precision". Note that the SP/PE0 also contains a reconfigurable register file 111 of the same type as used in the PEs. These configurable register files are also termed the compute register files or CRFs.

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit or 64-bit broadcast data bus 126. The other PEs 151, 153, and 155 contain common physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 various presently preferred aspects of which are described in greater detail in U.S. Pat. No. 6,023,753 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. A primary presently preferred mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray control bus (MCB) 191 is also shown. All of the above noted patents and applications are assigned to the assignee of the present invention and incorporated herein by reference in their entirety.

In a ManArray processor, such as the processor 100 shown in FIG. 1, each SP and PE utilizes logically the same CRF 111, 127, 127', 127", and 127''', address register file (ARF), and execution units with a common set of priority rules for writing to the register files whenever a target register conflict situation occurs.

In general, PE register-to-register instructions may only use PE registers for source operands, and PE registers as the result operand destination. PE memory-to-register instructions may only use PE memory as a source and PE registers as the target operand destination. Similarly, PE register-to-memory instructions may only use PE registers as an operand source and PE memory as an operand destination. The DSU PE-to-PE register-to-register transfer instructions are an example of register-to-register instructions.

In general, SP register-to-register (or memory-to-register) instructions may only use SP registers (or SP memory) for SP source operands, and SP registers as their destination. Similarly, SP register-to-memory instructions may only use SP registers as their source and SP memory as their destination.

Figure 2:
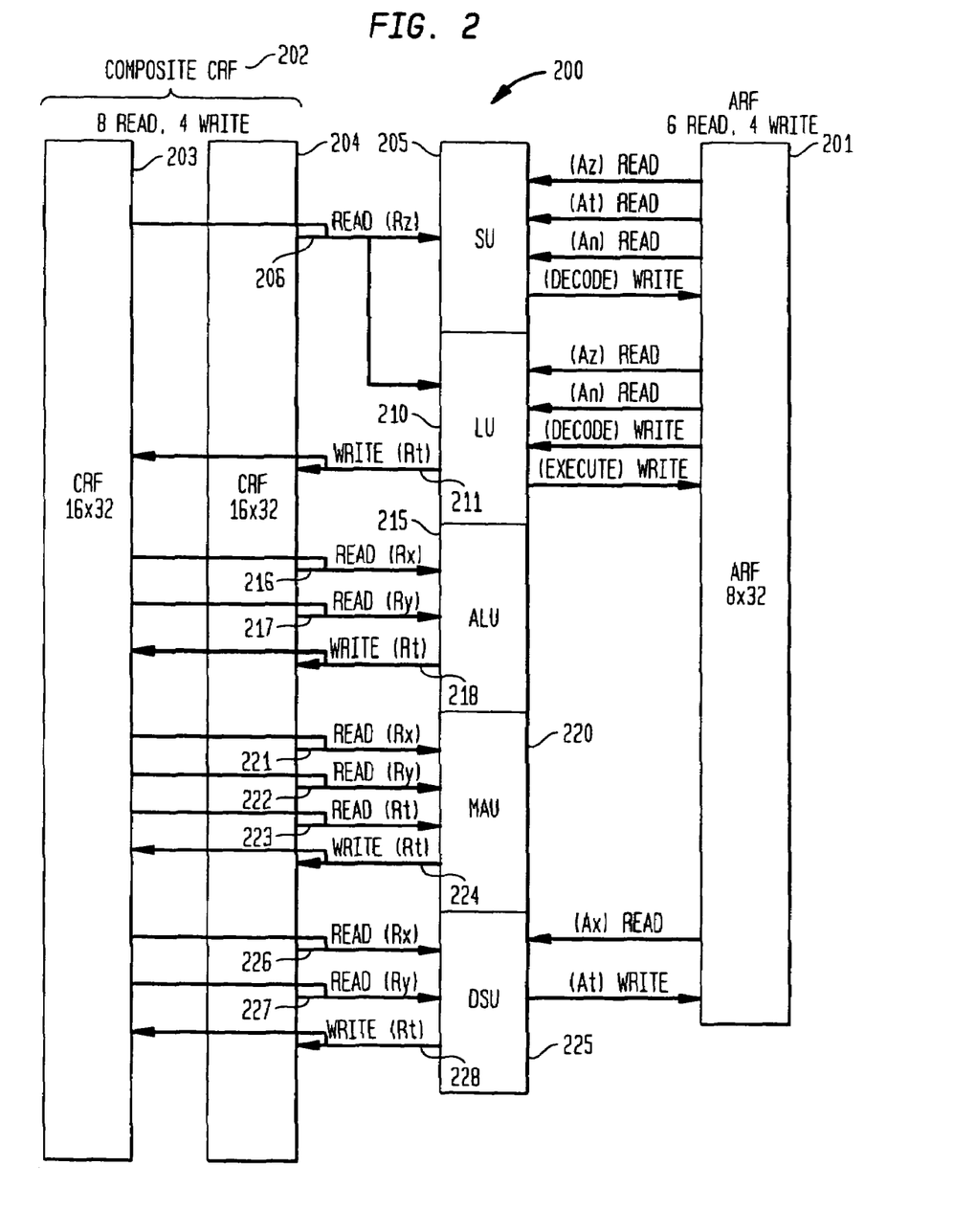
FIG. 2 illustrates a logical view of compute register file (CRF) ports and address register file (ARF) ports as assigned for the execution units of each sequence processor (SP) and processing element (PE) of FIG. 1 in accordance with the present invention.

The CRF and ARF port assignment diagram 200 of FIG. 2 shows a logical view of the compute register file (CRF) ports and address register file (ARF) ports for each SP and PE execution unit of FIG. 1. The register files logically interface with the execution units as shown. For example, the ALU Rx read port interface 216 is implemented as a multiplexed path between the two output read ports of each 16×32-bit register file macro (RFM). Similarly, the write ports may consist of two separate 32-bit result buses that are appropriately controlled to write to each 16×32-bit RFM. Specifically, the ALU 215, MAU 220, and DSU 225 units have dedicated read/write ports that provide complete access to the ARF and CRF for their respective instructions. The store unit (SU) 205 and load unit (LU) 210 have dedicated read/write ports to the ARF. However, the LU shares the SU's read port to the CRF.

If two or more execution units try to write the same ARF or CRF register at the same time, the highest priority unit, at the granularity of the conflict, word, half-word, or byte, is granted write access. For a presently preferred embodiment of the invention, unit write priorities in order of highest to lowest are: LU, ALU, MAU, and DSU. It is noted that the port priority logic could be either fixed or programmable. If programmable, then the programmer has more flexibility in determining how combinations of operations in a VLIW determine the actual results written to the target register. This flexibility extends the general capabilities of the port priority function. In addition, there is a port priority control of the ARF access within the LU. An LU write in the decode pipeline stage has priority over a LU write in the execute pipeline stage.

It is noted that the port priority concept is not limited to the described register sizes. For example 32-bit, 128-bit, and other register sizes can be used. For these other register sizes, conflicting and non-conflicting data type operations can be specified in a VLIW targeting the same register address. Consequently, on the conflicting data-types the port priority logic specifies which operation completes.

Detailed Register File Specification

The register file macro (RFM) is a multi-ported storage device with asynchronous read and synchronous write capability, that supports the ManArray architecture for pipeline stages that write data from the execution units to the CRF and ARF. Two RFMs 203 and 204 of FIG. 2, each 16×32-bits in capacity, are used to form a composite ManArray CRF 202. During a single-cycle execution stage, input operands are fetched from the RFM at the beginning of the cycle, operations are performed, and results are written back to the RFM at the end of the cycle.

The RFM is comprised of an array of storage cells and a set of access ports for 5 functional units (MAU, ALU, DSU, SU & LU). The storage cells, which hold execution unit operands, are organized as 16 addressable, byte-writable locations, each 32 bits wide. It is appreciated that in general, other size RFMs are equally applicable depending upon instruction set format design such as 32×32, 32×64, and 64×32 to name only a few. Each functional unit has a set of dedicated, single-cycle access ports for reading and writing the array. There are a total of 12 ports: 8 read ports and 4 write ports in the exemplary ManArray processor of FIG. 1. Again, it is appreciated that RFMs with different number of read and write ports are equally applicable. A summary of the available ports for the compute register file (CRF) 202 is shown in the logical view of the RFMs in FIG. 2 as follows:

The SU 205 uses 1 read port 206 and 0 write ports.
The LU 210 shares the SU's read port 206 and uses 1 write port 211.
The ALU 215 uses 2 read ports 216 and 217 and 1 write port 218.
The MAU 220 uses 3 read ports 221, 222, and 223 and 1 write port 224.
The DSU 225 uses 2 read ports 226 and 227 and 1 write port 228.

Each cycle any read port can read any location independently of any other port, and when multiple ports read the same location, each port receives the same data. Each cycle any write port can store data to any location, if no location contention occurs. When multiple ports attempt to write the same location in the same cycle, however, a conflict occurs and only one of the ports at the granularity of the data type conflict successfully changes the location's data, while the other port's conflicting data is discarded. At the time of execution, the priority scheme resolves write port conflicts for byte, half-word, or word data by determining which port bytes actually change the data at that location. For a presently preferred priority scheme, the default or fixed write port priority order from highest to lowest is LU, ALU, MAU, and DSU.

When a read and write of the same location occur in the same cycle, the read is done before the write. Updating of the location with the write data does not occur until the rising clock edge at the end of the cycle.

Figure 3:
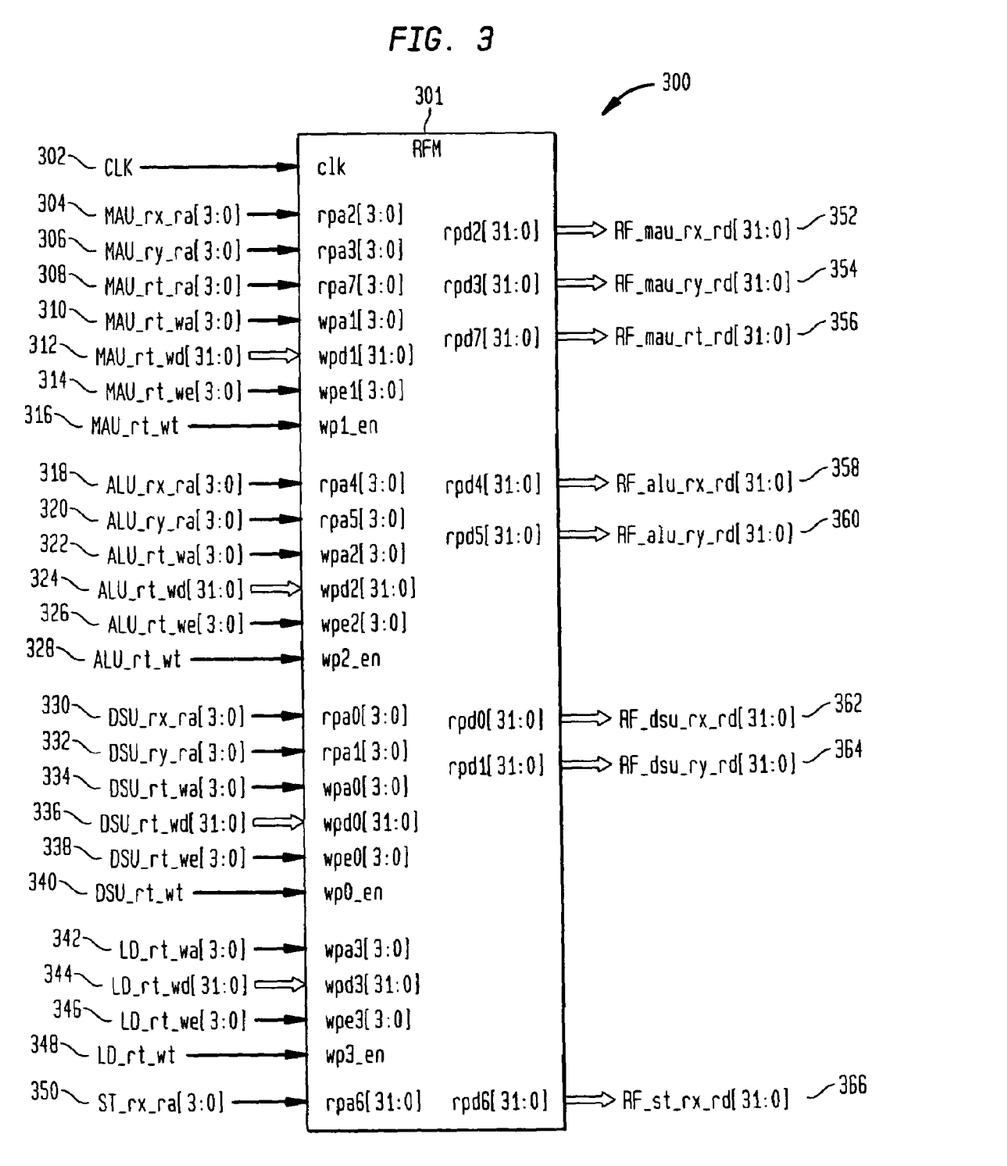
FIG. 3 illustrates a detailed signal pin diagram for a register file macro in accordance with the present invention.

The RFM connection diagram 300 of FIG. 3 shows an exemplary connection of the ManArray execution unit signals to the RFM address, data, and control signals for one of the 16×32-bit RFMs 301. The following list provides the description of the pin signals shown in FIG. 3:

Processor Clock—CLK pin signal 302 is the main processor clock. All sequential logic internal to RFM 301 is synchronized to the rising-edge of CLK.
Read Data Bus—RPDx[31:0], x=port number, (x=0,1,2,3,4,5,6,7). An RPDx[31:0] bus is used by the RFM 301 to supply data during an execution unit read operation. Data on this bus is considered valid by the unit only after the port's read address (RPAx) is stable and its RFM access time has been met. For the MAU, x=2 (352), 3 (354) and 7 (356). For the ALU, x=4 (358) and 5 (360). For the DSU, x=0 (362) and 1 (364). For the store unit, x=6 (366).
Read Address Bus—RPAx[3:0], x=port number, (x=0,1,2,3,4,5,6,7). An RPAx[3:0] bus is used by an execution unit to supply the read address to the RFM 301 during a read operation. For the MAU, x=2 (304), 3 (306), and 7 (308). For the ALU, x=4 (318) and 5 (320). For the DSU, x=0 (330) and 1 (332). For the store unit, x=6 (350).
Write Port Execution Enables—WPx_EN, x=port number, (x=0,1,2,3). WPx_EN signals are asserted (active high) by the execution unit indicating to the RFM 301 to update the storage location according to its write address (WPAx), byte enables (WPEx) and data (WPDx). For the MAU, x=1 (316). For the ALU, x=2 (328). For the DSU, x=0 (340) and for the Load Unit, x=3 (348).
Write Port Address Bus—WPAx[3:0], x=port number, (x=0,1,2,3). A WPAx[3:0] bus is used by an execution unit to supply the write address to the RFM 301 during a write operation. For the MAU, x=1 (310). For the ALU, x=2 (322). For the DSU, x=0 (334) and for the Load Unit, x=3 (342).
Write Port Data Bus—WPDx[31:0], x=port number, (x=0,1,2,3). A WPDx[31:0] bus is used by an execution unit to supply write data to the RFM 301 during a write operation. For the MAU, x=1 (312). For the ALU, x=2 (324). For the DSU, x=0 (336) and for the Load Unit, x=3 (344).
Write Port Enable Bus—WPEx[3:0], x=port number, (x=0,1,2,3). WPEx[3:0] signals are the byte write enable signals. These signals are asserted (active high) by an execution unit and used by the RFM 301 to write specific data bytes. WPEx bit$_i$ corresponds to data byte$_i$. (E.g. when WPEx[3] is asserted, data byte 3 (bits 31:24 of WPDx) is written.) For the MAU, x=1 (314). For the ALU, x=2 (326). For the DSU, x=0 (338) and for the Load Unit, x=3 (346).

Operation Description

Figure 4A:
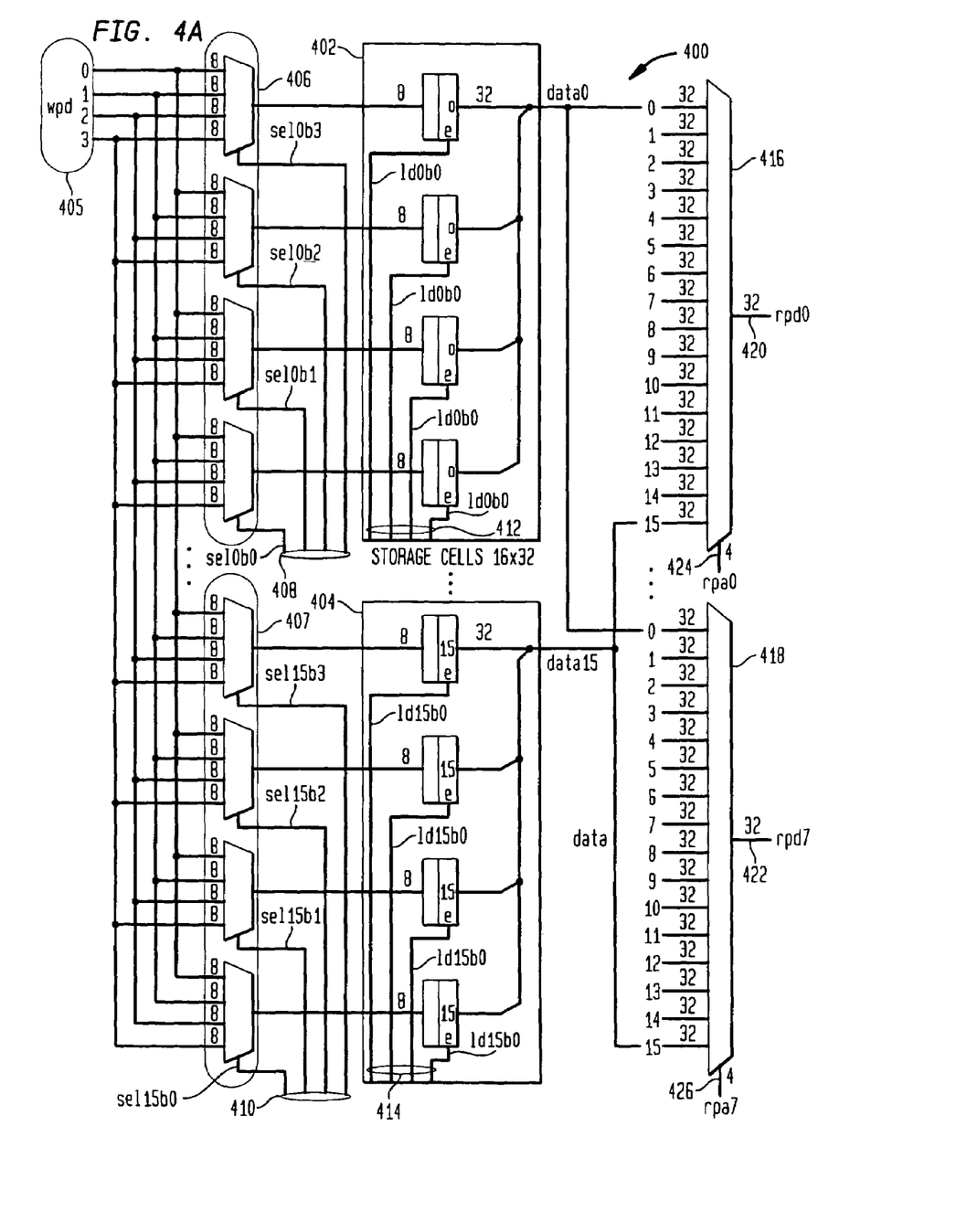
FIG. 4A illustrates an exemplary logic block diagram for the timing critical data path components of the register file macro in accordance with the present invention.
Figure 4B:
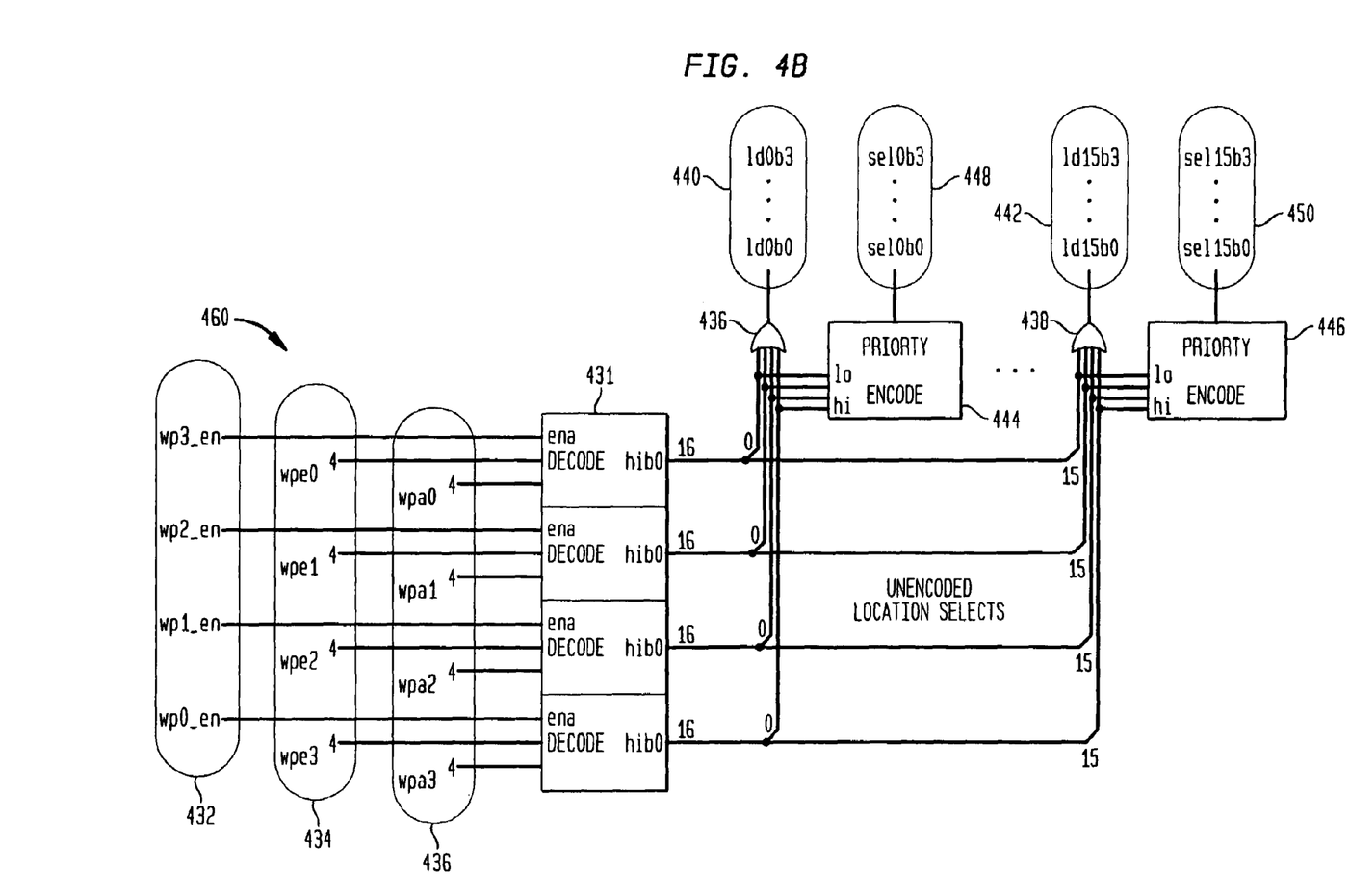
FIG. 4B illustrates an exemplary logic block diagram for the less timing critical write control components of the register file macro in accordance with the present invention.

FIGS. 4A and 4B show exemplary logic block diagrams 400 and 460 illustrating various aspects of the functionality of the register file macro, as described in greater detail below. FIG. 4A shows exemplary timing critical data path components, while FIG. 4B shows an exemplary embodiment of the less timing critical write control logic.

Each block, 402 and 404, represents one 32-bit location of the storage array (the module with the black vertical bar) and its associated write datapath. There are 16 addressable locations. The external write data (wpdx) 405 of the 4 write ports is selected (seljbi), by the signals on lines 408 and 410 through multiplexers 406 and 407 to update a particular byte of the storage cell. In FIG. 4A, two of the 16 location seljbi signals are illustrated. Updating occurs on a byte basis when the selected byte enable signal is asserted, and that location has been write addressed (ldjbi) where the signals on lines 412 and 414 illustrate two of the 16 location ldjbi signals. Note that i (0, 1, 2, or 3) indicates the byte of a particular 32-bit location and j (0,1,2,3, . . . ,15) indicates which storage cell. To the right of FIG. 4A, there are eight, 32-bit, 16 input multiplexers to allow reading of any location (data) to any read data port (rpdx). Two exemplary multiplexers 420 and 422 are shown for ease of representation. The reading of any location to any read data port is controlled by application of a corresponding read address (rpax). In FIG. 4A, exemplary read address lines 424 and 426 are shown for the multiplexers 416 and 418. Similar read address lines are employed for the other six multiplexers which are not shown for ease of representation.

FIG. 4B shows the surrounding logic 460 for write priority and register load control. Each port's write address (wpax) 430 is decoded by a decoder 431 into 16 unencoded location select signals, which are qualified with corresponding execution enable (wpx_en) signal 432 and byte write enable (wpex) signals 434. These true high unencoded select signals are recombined to produce location-relative ldjbi and seljbi signals, where i (0, 1, 2, or 3) indicates the byte of a particular 32-bit location and j (0,1,2,3, . . . ,15) indicates which storage cell.

For each location and on a byte basis, the unencoded select lines are logically ORed, for example, by illustrated OR gates 436 and 438, to generate the byte load enable (ldjbi) signals, for example 440 and 442, as well as priority-encoded, for example, by priority encoders 444 and 446, to produce 2-bit multiplexer select (seljbi) signals, for example, signals 448 and 450, for wd selection. Write port3 is highest priority and write port0 is lowest priority. For example, if in a particular clock cycle a write to address 0 occurred from both port 3 and port 0, the data bytes of wpd3 enabled by write port 3 would be written to address 0, and only bytes enabled by write port 0 that were not enabled by port 3 would be written with wpd0's data.

The correspondence between the diagram's write port references and the external execution ports for a fixed or default priority order is as follows:

Port3=LU (highest priority)
Port2=ALU
Port1=MAU
Port0=DSU

Figure 4C:
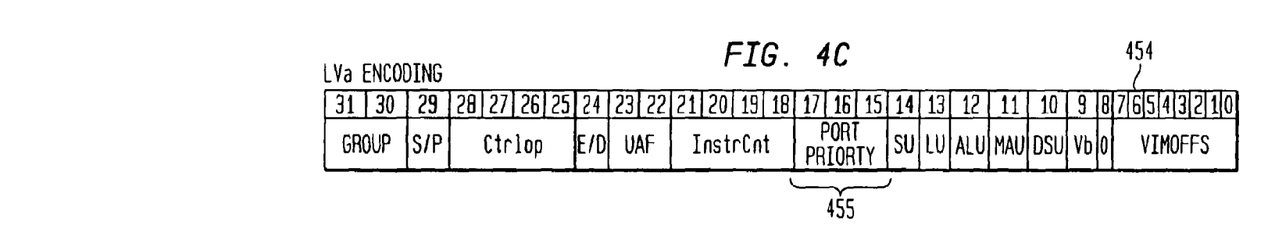
FIG. 4C illustrates a new load/disable VLIW (LVa) delimeter instruction that specifies programmable port priority order in accordance with the present invention.

A programmable port priority requires that the specification of the priority order be controlled by the programmer. There are a number of ways to accomplish this programmability. In one approach, the VIM is extended in width to accommodate an additional slot that holds the port priority order. In this way, each VLIW can have a unique port priority order that is specified at the time of loading the VLIW into the VIM. For further details on the operation of the load VLIW (LV) instruction see U.S. patent application Ser. No. 09/187,539 entitled "Methods and Apparatus for Efficient Synchronous MIMD Operations With iVLIW PE-to-PE Communication" and filed Nov. 11, 1998 which is incorporated by reference herein in its entirety. The LVa instruction, shown in FIG. 4C, is an extension of the LV described in the previously mentioned patent application employing the three priority bits (17–15) 455 as shown in encoding format 454 of FIG. 4C. The bits 455 are used to specify up to eight port priority orderings for the VLIW being loaded. These three bits or their pre-decoded eight signals are loaded in the VIM at the LV specified address. When an execute VLIW (XV) instruction is executed, the VLIW instructions and the port priority bits are read out of the VIM and the port priority logic is set up prior to the VLIW execution cycle.

Figure 4D:
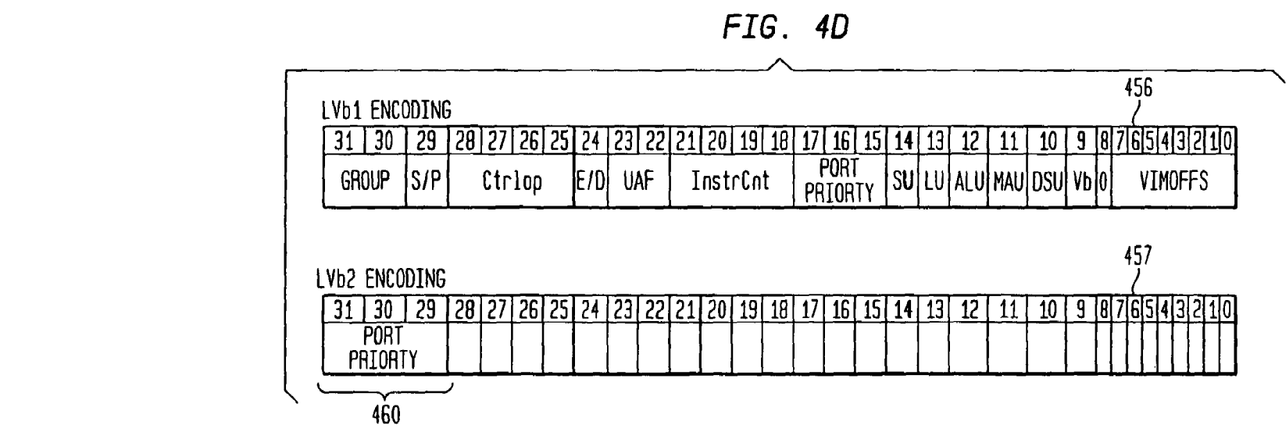
FIG. 4D illustrates a new load/disable VLIW with VLIW parameters (LVb) instruction that specifies programmable port priority order in accordance with the present invention.

It is noted that the LV specified sequence of up to six instructions, an LV delimeter, followed by up to five instructions to be loaded into the VIM address as described in the aforementioned patent application, can be extended to include one additional new 32-bit value 457 that is a grouping of parameters which specifies specific information on how that VLIW is to operate as specified by the LVb1 encoding format 456 of FIG. 4D. For example, the programmable port priority bits, which can be 3, 4, or 5 bits 460 given the present four write port register files, can be specified in an additional parameter delimeter in LVb2 encoding format 457 of FIG. 4D. This VLIW parameter line 457 is preferred to follow directly after the LV delimeter 456 after which follow the instructions to be loaded into the specified VIM address. When an execute VLIW (XV) instruction is executed, the VLIW instructions and the port priority bits are read out of the VIM and the port priority logic is set up prior to the VLIW execution cycle.

Figure 4E:
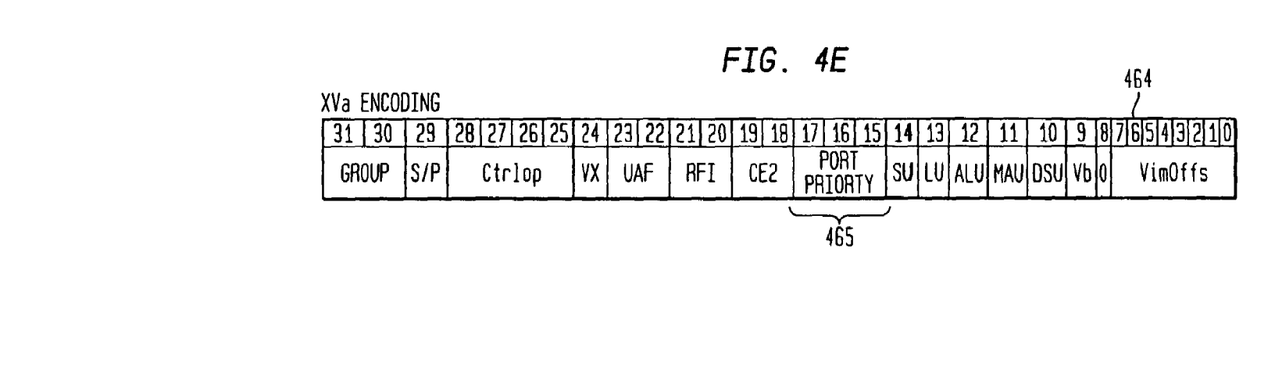
FIG. 4E illustrates a new execute VLIW (XVa) instruction that specifies programmable port priority order in accordance with the present invention.

Another alternative approach places the port priority bits into an XV instruction as shown in encoding format 464 of FIG. 4E. This format is an extension of the XV instruction described in detail in U.S. application Ser. No. 09/187,539. In FIG. 4E, three bits (17–15) 465 are used to specify up to eight priority orderings for the VLIW being executed. In this approach, no port priority bits are required to be stored in the VIM. When an XV instruction is received, the port priority logic is set up prior to the specified VLIW is executed based upon the three bits 465 of that XV.

Figure 4F:
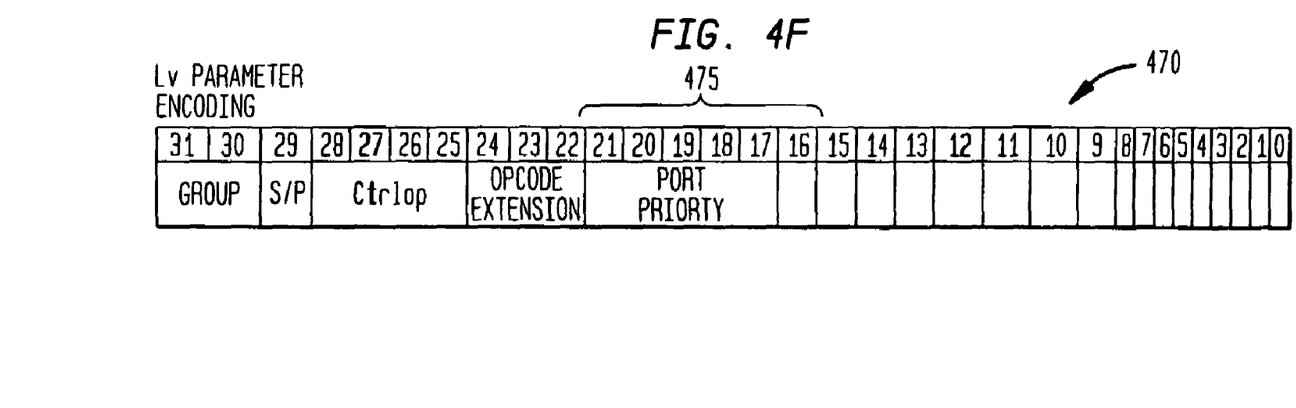
FIG. 4F illustrates a new LV parameter instruction.

The VLIW parameters of second delimeter instruction 457 can be encoded as a separate 32-bit instruction 470 as shown in FIG. 4F, wherein five bits (21–17) 475 specify the write port priority ordering. This instruction if executed in sequential code is treated as an nop. Its proper use is following a LV instruction as shown in FIG. 4F in which case it specifies the parameters to be loaded into the VIM address for the VLIW to be loaded, the instructions of which typically follow the VLIW Parameter instruction.

It is noted that for those architecture options where the port priority order is specified at a VIM address the priority order bits are cleared automatically whenever a VLIW is loaded into that VLIW line, which cleared state specifies a default priority ordering. The port priority bits in a VIM line are only activated for the VLIW when explicitly specified in an LV instruction, otherwise they remain in the default state.

Examples of Using Priority Port Controls to Implement a Unique Function

The following is an example of a software routine that demonstrates the ability of the present invention to implement the MPEG VLD function getbits( ) in 3 cycles.

Notes on the 3-cycle Implementation
   32 and 64 bit shift operations are used
   The algorithm is pipelined so that the first iteration returns invalid data in r2. The next iteration returns the result of the first iteration. Iteration I returns the result of iteration I–1.
   The sequential algorithm is:

```
n;               // input parameter assumed to be the number of bits requested
static r1r0 ;    // 64 bit register pair used to hold next bits in stream
r1;              // alias for upper half of r1r0 (uses same register)
r0;              // alias for lower half of r1r0 (uses same register)
bits;            // Return value: bits requested.
static b = 32;   // working variable initialized to 32 before first call
static x;        // another working variable (stores n–b)
mem[];           // memory array containing bit stream
i = 2;           // working index into memory array (two words preloaded into r1r0)
getbits:
ShiftRight32( bits, r1, 32-n);   // shift r1 right by 32-n bits and store in 'bits'
x = n - b;                        // init working variable to n - b
if (n ≧ b)
{
```

-continued

```
ShiftLeft64(r1r0, r1r0, b);   // r1r0 ← (r1r0 shifted left by b)
                              // shift r1r0 left enough bits to have valid bits in r1
r0 = mem[i++];                // Load next word from memory
ShiftLeft64(r1r0, r1r0, x);   // shift r1r0 left the remainder (x = n − b)
b = 32 − x;                   // adjust b
}
else
{
 ShiftLeft64 (r1r0, r1r0, n); // no need to load, so shift r1r0 left by number of bits
 b = b − n;                   // adjust b = b − n = −x
}
VLIW pseudo code:
    r0, r1 used for bit stream
    r3 = n, number of bits requested
    r4 = b
    r5 = x
    r6 = 32
    r7 = y (working register to hold 32-n from previous call)
    r2 = output bits from iteration I −1. (First pass returns garbage)
    mem[i] is pointed to by a0
    temp is a memory location used to store the MSW of the bitstream regs (r1:r0) to be
    used
next pass.
```

Figure 5:
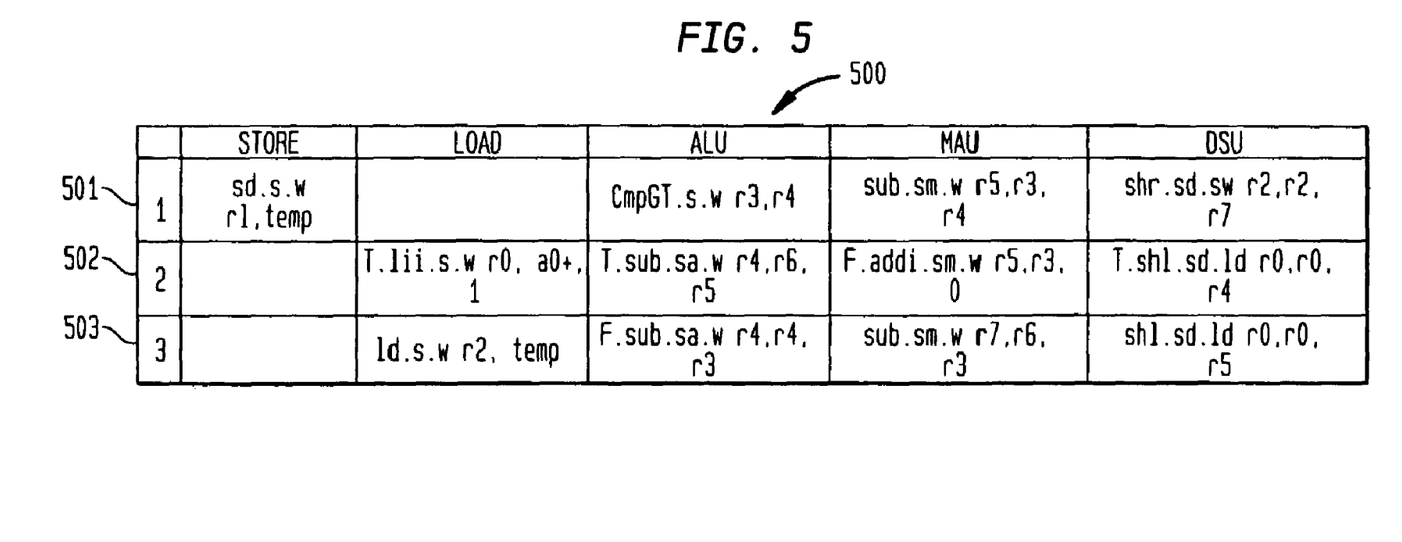
FIG. 5 illustrates an exemplary VLIW program using the port priority functions of the present invention on a 32-bit word basis.

FIG. 5 shows a list 500 for three VLIWs 501–503 identifying the STORE, LOAD, ALU, MAU and DSU execution unit slot utilization for the three VLIWs. It is seen from FIG. 5, that for VLIW 502, the load unit instruction (LOAD) T.lii.s.w r0, a0+, 1 targets CRF register r0 and the DSU slot contains an instruction T.shi.sd.1d r0, r0, r4 which also targets CRF register r0. The double word operation identifies an even odd pair of registers in the CRF. The load instruction is a single word data type operation, identified by the .w syntax, and the DSU instruction is a double word data type operation, identified by the .1d syntax. The hardware priority logic gives priority to the load unit for single register r0 while the double word shift operation in the DSU is able to write to the odd register r1.

Figure 6:
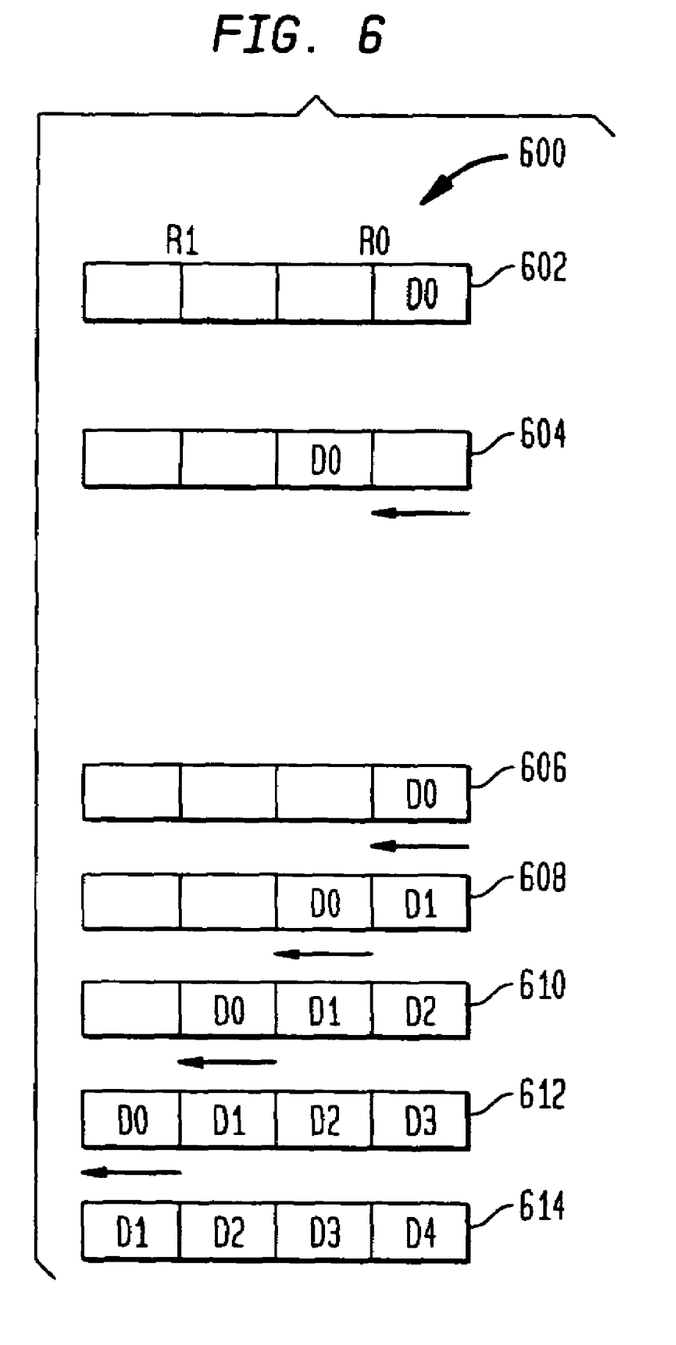
FIG. 6 illustrates an example of two instructions, their individual execution operation, and the result of using the present invention to accomplish a port register overlay function.
Figure 7:
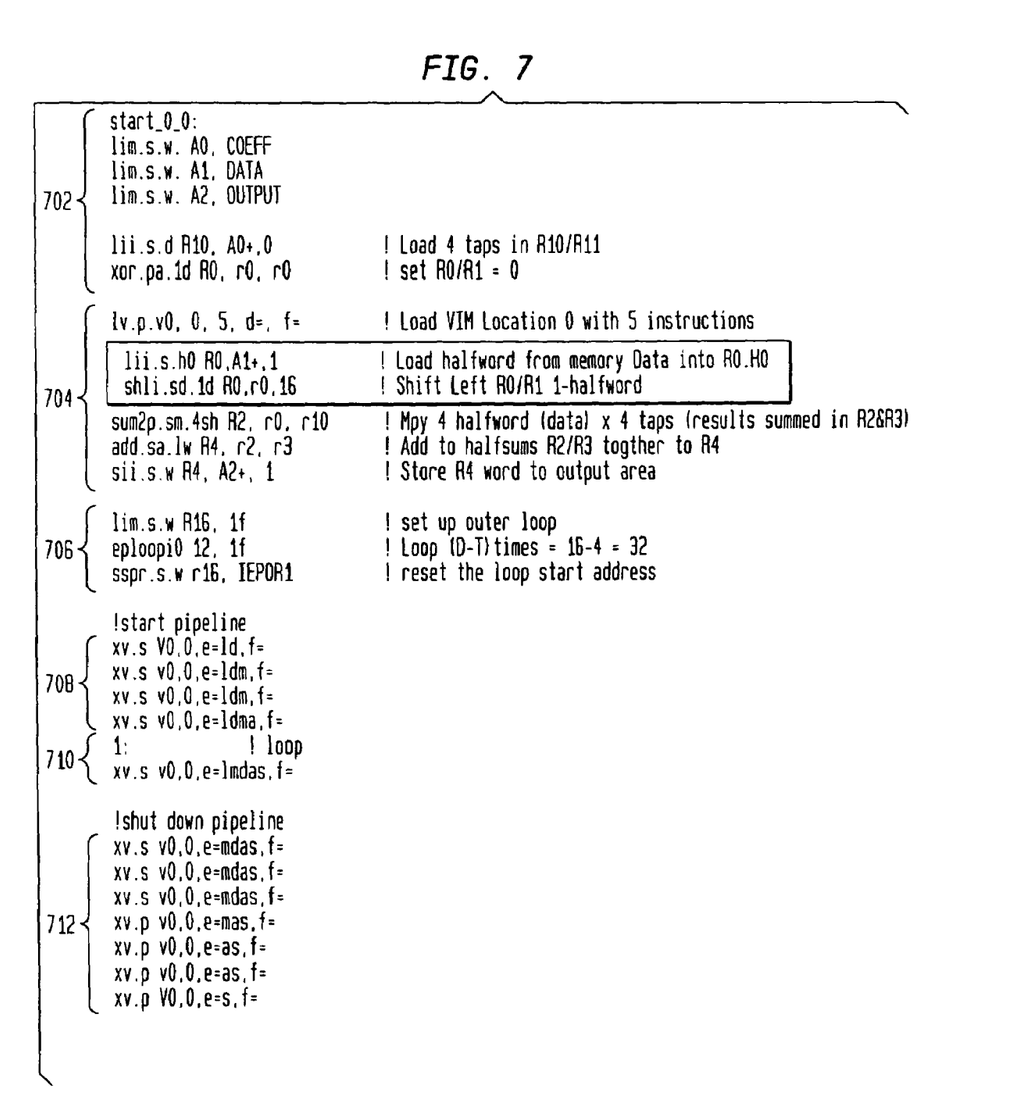
FIG. 7 illustrates an example of a VLIW program, 4 tap FIRfilter program, using the port priority functions of the present invention on a 16-bit half-word basis.
Figure 8:
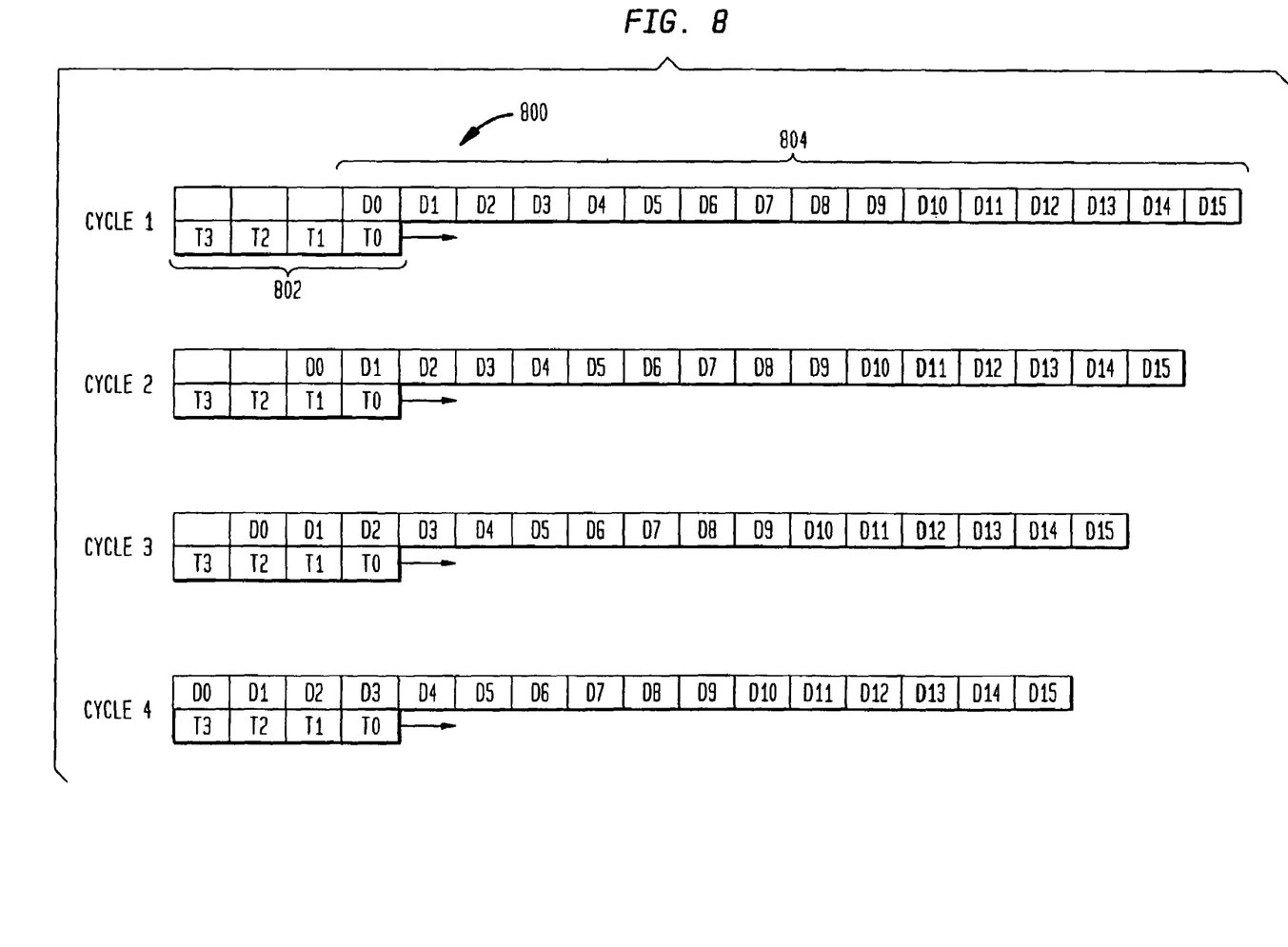
FIG. 8 illustrates the first four cycles of operation of the exemplary 4 tap FIRfilter program of FIG. 7 for a fifteen element data stream.
Figure 9:
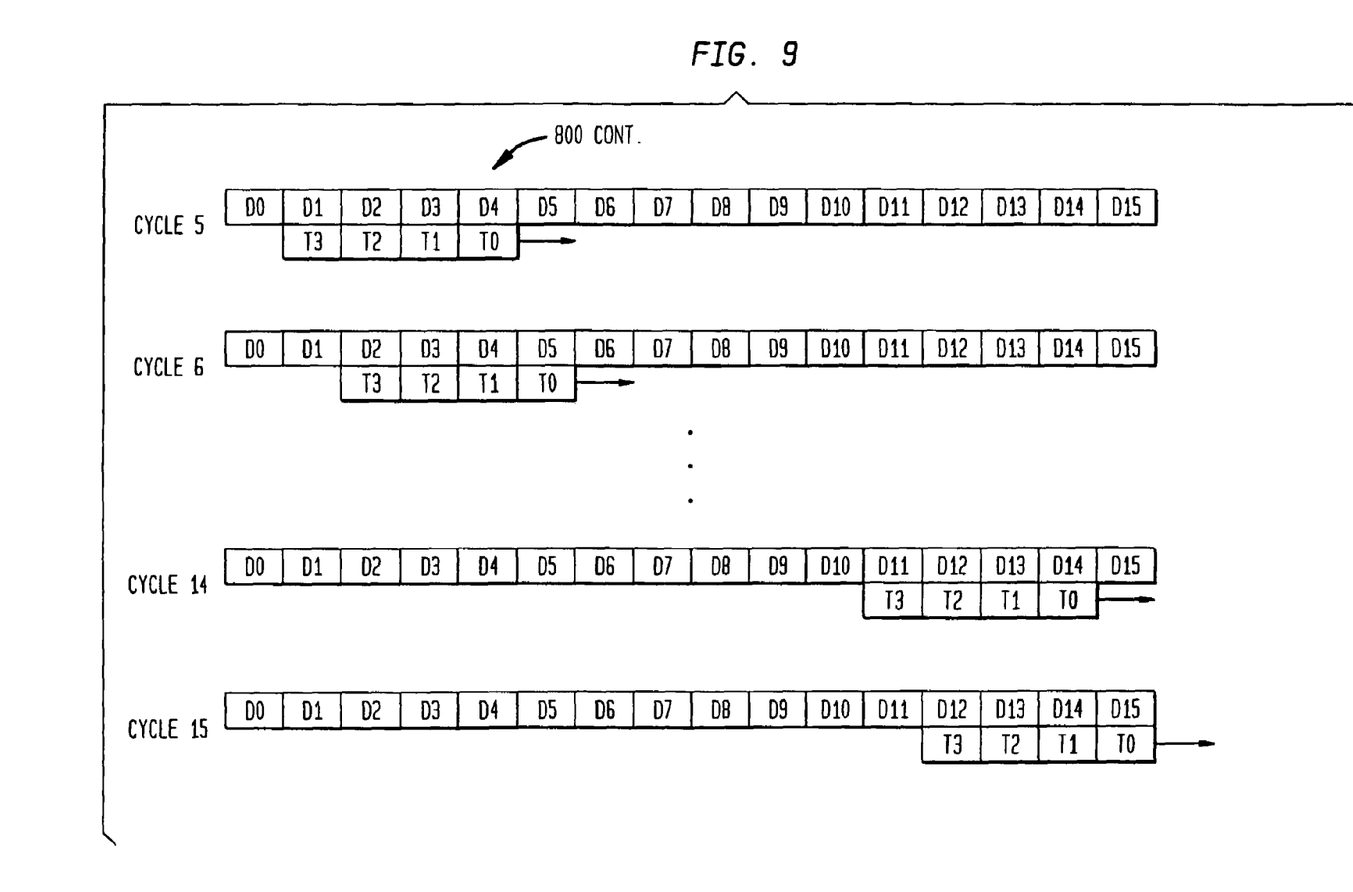
FIG. 9 illustrates intermediate operations for cycles 5–15 of the exemplary 4 tap FIR filter program of FIG. 7 for a fifteen element data stream.
Figure 10:
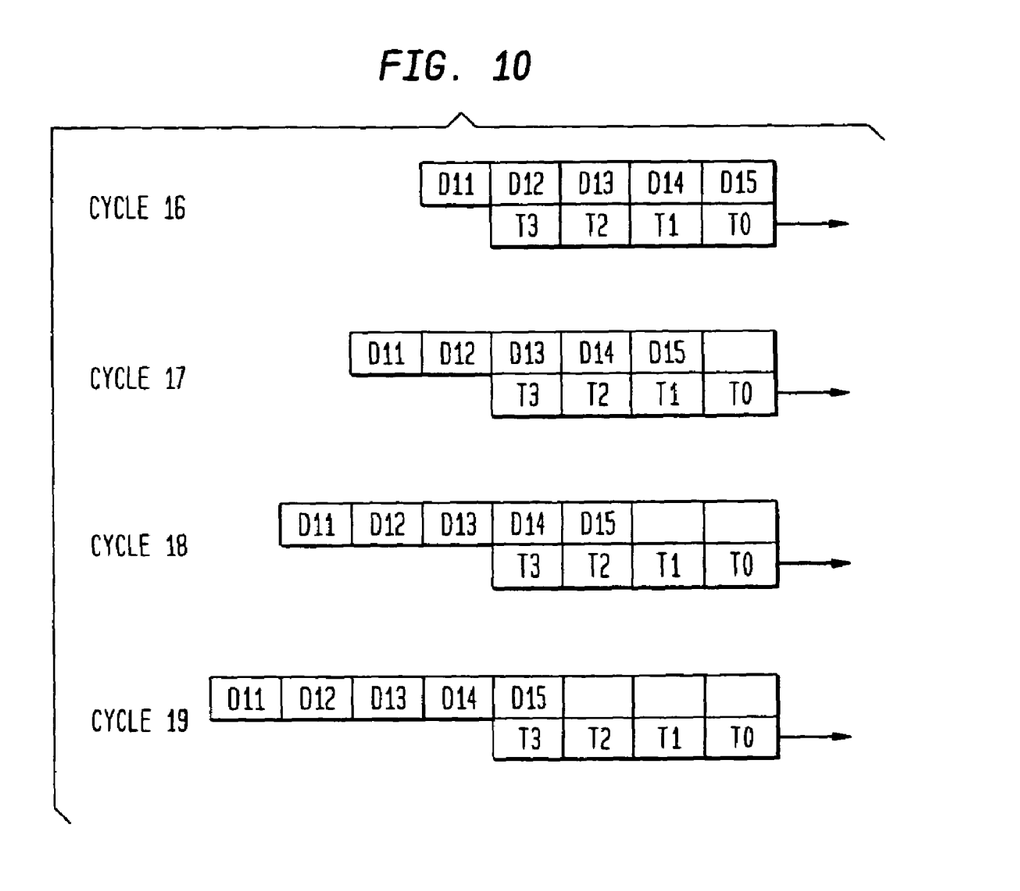
FIG. 10 illustrates the last four cycles of operation of the exemplary 4 tap FIR filter program of FIG. 7 for a fifteen element data stream.

FIG. 6 illustrates use of the port priority function to produce a port register overlay of data that is used in an exemplary 4 tap FIRfilter program. In FIG. 6, a process 600 of loading and shifting data is illustrated. In step 602, the result of loading a 16-bit half-word D0 into a 64-bit register pair R1/R0 by use of the Lii.s.h0 R0, A1+,1 load instruction is illustrated. This instruction loads a halfword of incoming data into register R0. The register pair R1/R0 is shown in step 604 after the result of executing the shift shli.sd.1d R0,r0, 16 instruction. This instruction shifts the same register left one halfword. By repeatedly using both instructions in the same VLIW and using the port priority function to overlay the half-word data in the H0 half-word of the 32-bit register R0, the sequence of operations shown in steps 606–614 can be accomplished to move through a data stream. FIG. 7 illustrates actual code or program 700 to accomplish this sequence of operations for a 4 tap FIRfilter. The ManArray program 700 consists of an initialization sequence 702, a load VLIW (LV) sequence 704, a loop set up sequence 706, a build up of the software pipeline sequence 708, an actual looping of the VLIW instruction 710, and a software pipeline teardown sequence 712. In the LV sequence 704, the two instructions described in FIG. 6 are used with both instructions targeting the same R0.H0 half-word section. The port priority function in operation for the listed program of FIG. 7 is shown in a cycle by cycle sequence of operations 800 in FIGS. 8 (cycles 1–4), 9 (cycles 5–15), and 10 (cycles 16–19). In these FIGS. 8–10, it is shown how a sequence of sixteen data elements, D0–D15,is sequenced through in a register pair that holds the data for the tap operations T3-T0 802 which are shown in FIG. 8, for example, underneath a sixteen element data stream 804. The register port overlay process of FIGS. 8–10 multiplies a 64-bit register holding halfword data elements with corresponding halfwords in a 64-bit register holding four FIR filter taps, producing a new output element each cycle. In this process, the ManArray port overlay function of the present invention is utilized to effectively slide the taps one data position over each cycle, as seen in FIG. 10, for example.

While the present invention has been disclosed in the context of various aspects of presently preferred embodiments, it will be recognized that the invention may be suitably applied to other environments and applications consistent with the claim which follow.

We claim:

1. A processing apparatus comprising:
   a memory register storage device comprising a first portion and a second portion;
   a processing element comprising a first execution unit and a second execution unit for reading from and writing to the memory register storage device; and
   port priority control logic for resolving a write conflict occurring when the first execution unit attempts to write to both the first portion and the second portion, and the second execution unit attempts to write to the second portion,
   said port priority control logic allowing the first execution unit to write to the first portion,
   said port priority control logic allowing the first execution unit to write to the second portion if the first execution unit has a higher port priority than the second execution unit,
   said port priority control logic allowing the second execution unit to write to the second portion if the second execution unit has higher port priority than the first execution unit.

2. The processing apparatus of claim 1 wherein the bit width of the first portion equals the bit width of the second portion.

3. The processing apparatus of claim 1 wherein the port priority is programmable.

4. The processing apparatus of claim 1 wherein the memory register storage device is a computer register file.

5. The processing apparatus of claim 1 wherein the processing elements reading a very long instrisction word (VLIW) to determine whether to write to the first or second portion.

6. The processing apparatus of claim 1 wherein the processing element thither comprises a third execution unit, the third execution unit completing a write operation to the memory register storage device white conflicting write operations are prioritized for completion.

7. A method for resolving write conflicts between a first execution unit and a second execution unit disposed in a processing element, the method comprising:
   providing a memory register storage device comprising a first portion and a second portion;
   assigning a first port priority to the first execution unit;
   assigning a second port priority to the second execution unit; and
   resolving a write conflict occurring when the first execution unit attempts to write to both the first portion and the second portion, and the second execution unit attempts to write to the second portion, the resolving step further comprises
      allowing the first execution unit to write to the first portion,
      allowing the first execution unit to write to the second portion if the first execution unit has a higher port priority than the second execution unit,
      allowing the second execution unit to write to the second portion if the second execution unit has a higher port priority than the first execution unit.

8. The method of claim 7 wherein the bit width of the first portion equals the bit width of the second portion.

9. The method of claim 7 wherein the first port priority is programmable.

10. The method of claim 7 wherein the memory register storage device is a computer register file.

11. The method of claim 7 wherein the resolving step further comprises reading every long instruction word (VLIW) to determine whether to write to the first or second portion.

12. The method of claim 7 wherein the processing element further comprises a third execution unit, the method further comprising completing a write operation to the memory register storage device while conflicting write operations are prioritized for completion.

* * * * *